W. Wilber,
Oil Press,
Nº 16,422.
Patented Jan. 13, 1857.
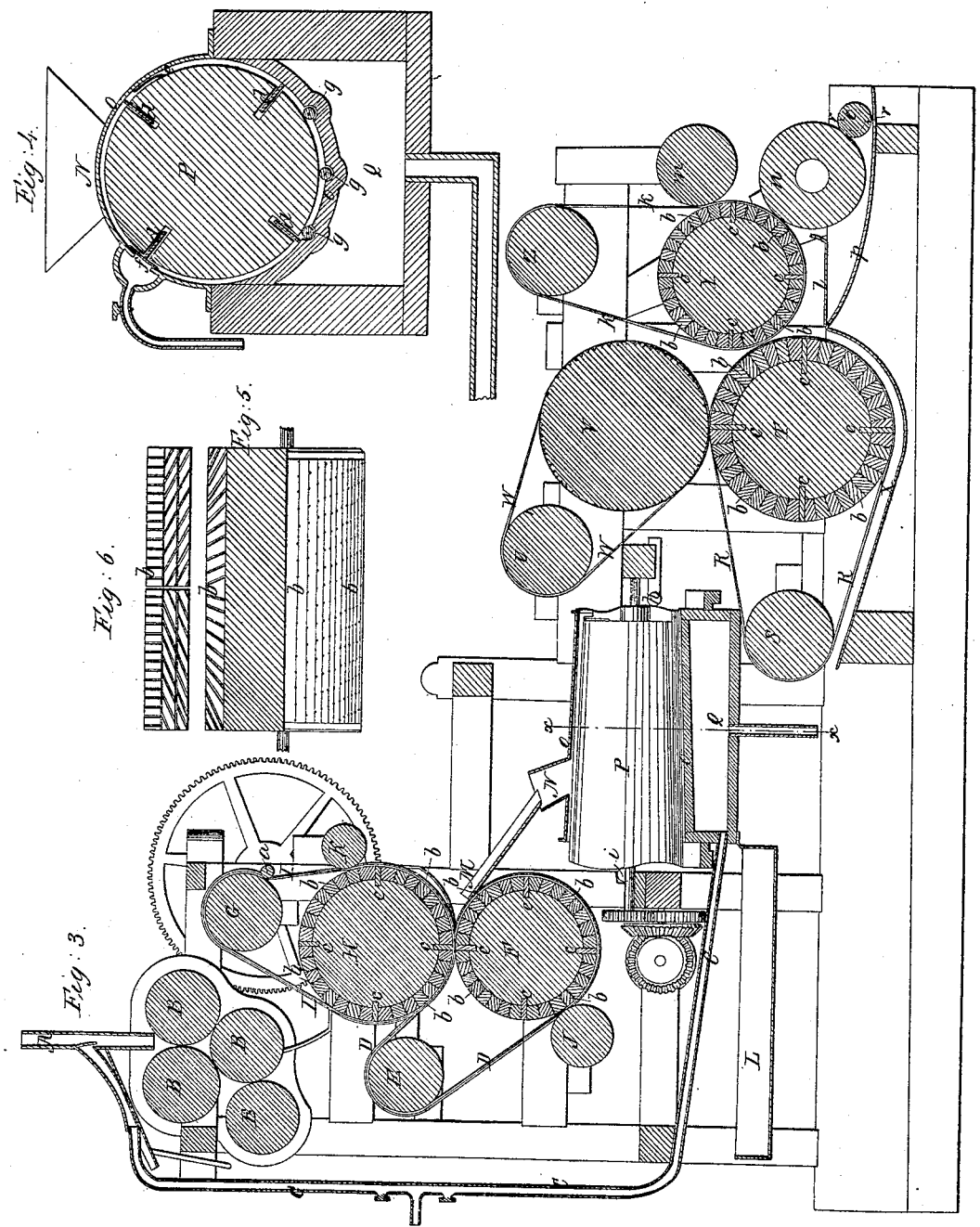

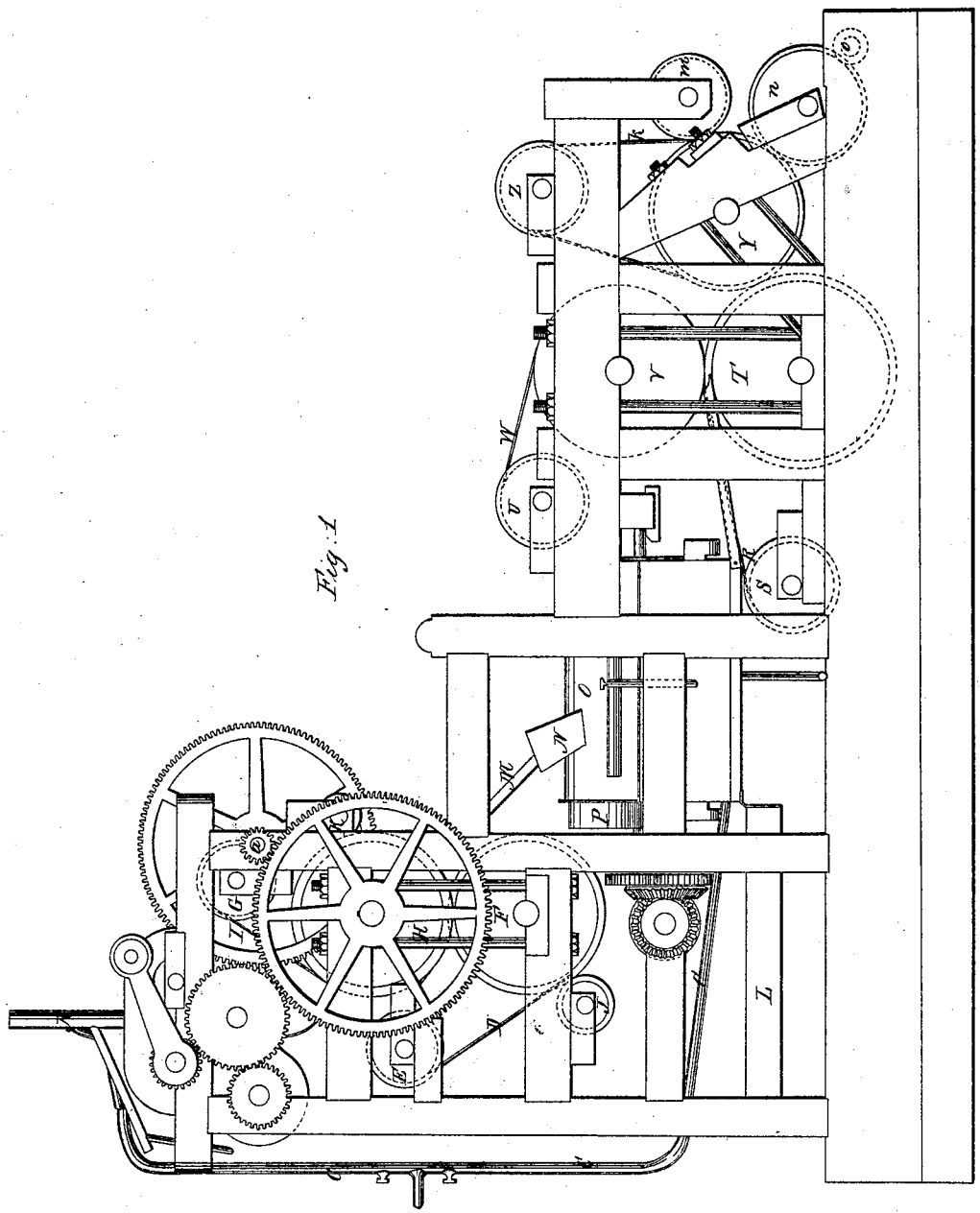

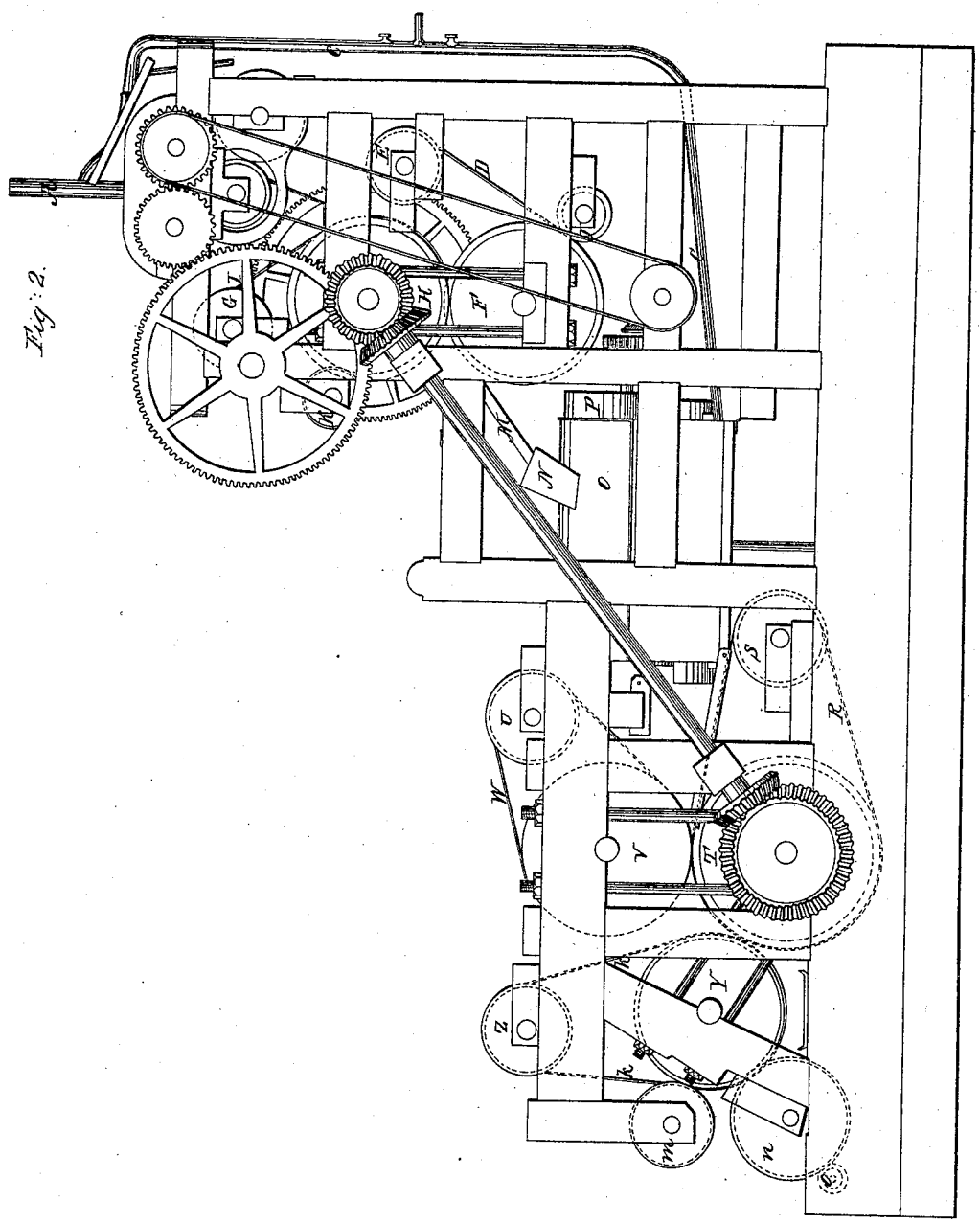

UNITED STATES PATENT OFFICE.

WM. WILBER, OF NEW ORLEANS, LOUISIANA.

OIL-PRESSING MACHINERY.

Specification of Letters Patent No. 16,422, dated January 13, 1857.

*To all whom it may concern:*

Be it known that I, WILLIAM WILBER, of New Orleans, in the parish of Orleans and State of Louisiana, have invented certain new and useful Improvements in Oil Machinery; and I do hereby declare the following to be a full, clear, and exact description of the same, reference being had to the accompanying drawings, making a part thereof, in which—

Figure 1, represents a view from one of the sides of the machine. Fig. 2, represents a view from the opposite side thereof, from Fig. 1. Fig. 3, represents, a vertical, longitudinal section taken centrally through the machine. Fig. 4. represents, on an enlarged plan, a vertical transverse section taken at the red line $x\ x$, of Fig. 3. Fig. 5, represents a front view of one of the rollers detached, and Fig. 6, represents one of the staves of the rollers detached.

Similar letters in the several figures denote like parts in all.

To enable others skilled in the art to make and use my invention, I will proceed to describe the same with reference to the drawings.

In this my improved oil machine, the seeds are taken from a bin and introduced into the crushing apparatus, from thence the crushed seeds pass through pressing machinery, to take off, what I call the cold pressed oil; from thence the partially formed cake passes into a heating and reducing apparatus, where it is prepared for a subsequent pressing by suitable machinery, which takes out the remaining oil in the crushed seeds, and which I call hot pressed oil. From this last pressing machinery the oil cake passes under a knife which cuts it up into conveniently shaped pieces to be readily removed. The seeds, therefore, may be said to be introduced into the machine at one end—the cold, and hot pressed oil, extracted therefrom at different places, and the oil cake removed in slices at the other end, the whole operation being a continuous one, without any handling, except the removing of the oil cake. These several operations I shall describe in the order of their procedure—first,

*Of the feeding in of the seeds.*—A, (more especial reference being had to Fig. 3,) is a tube or spout, leading from the bin or crushing rollers B, B, B, B, of which latter there may be any suitable number, more or less, than shown in the drawing. A steam pipe C, connects with the tube or spout A, for the purpose of introducing steam into and among the falling seeds, to moisten or saturate the hulls of the seeds, filling up their pores, and thus destroying their capacity for taking up oil. This previous moistening of the hulls of the oil seeds not only facilitates their after removal from the interior oily portions of the seeds, but having taken up all the moisture, which they can absorb, resist the entrance of oil therein, consequently making a saving in the product. The seeds being properly crushed and reduced between the rollers B, B, and C, drop down onto an endless belt D, which passes around the rollers E, F. Above the roller F are arranged two rollers G H similar in their character and construction to those E, F, around which pass an endless belt I.

J, is a friction or bearing roll pressing the belt D, to the roller F, to prevent slipping, and K, a similar pressing roll, which together with a smaller friction roll $a$ holds the belt I from slipping on its rollers. These pressing rolls should be so hung as that their friction or pinching properties may be regulated, to suit the quality of work to be done. The rollers F, H, are made of staves $b$, $b$, etc., with small holes or openings leading from their outer surfaces toward the interior of the rollers; these openings communicate with other longitudinal openings, furrows or troughs, previously cut in the sides of the staves, before putting them together, which form ducts for the oil, and lead it out at the ends of the rollers, whence it drips into a proper receiver L. The belts I, D, are made of heavy hair cloth, either woven or felted, or some other equally porous and strong material, and may if found necessary have a facing or lining of other material to give them additional strength.

*The first pressing or cold pressing.*—The ground material, as before stated, drops onto the belt D, and is carried in on the belt between the rollers F, H, which presses out a great portion of the oil, the cake passing onto the conductor M, and thence into the after machinery, to be described. The oil thus expressed from the material I term cold pressed, it passes through the hair cloth belts I, D, into the openings in the cylinders, and thence through the ducts leading to the ends of the cylinders, where it runs out. To prevent the oil from remaining in the cylinders, I make the following arrangement viz: The cylinders are divided into quadrants (or greater or less sections) and a stave or stop $c$ introduced, at the end of each section. The grooves or furrows, on the sides of the staves, may then incline both ways from the center of the rollers (as seen in Figs 5, 6), the series of grooves of each segment terminating against the stop $c$ of each segment. These stops then force or direct the oil to the ends of the cylinders, whence it drops into the receiver. This above described operation takes out the cold pressed oil. Next follows the

*Heating and reducing operation.*—From the conductor M, the material passes into a hopper N, and thence into a cylinder O, within which a roller P, turns. Below the shell or cylinder O, is a steam chamber Q, into which steam is admitted through the pipe C, for heating up the cylinder, and the material within it, which is being reduced from the cake into small particles. The roller P, is provided with scrapers $d$, Fig. 4, which are forced out against the inner periphery of the shell O, to scrape off all adhering particles, and the inner periphery is also provided with a scraper $e$, for cleaning the roller P; $f$, Fig. 4 is a shield over the steam inlet, to prevent the material from choking up the steam way. The object in hanging the scrapers $d$, to springs, is that by means of a cam ledge on the outer shell, they may be forced into the roller P, when they pass the shield $f$, or the scraper $e$, and when they have passed spring against the inner periphery of the shell to scrape it, clean. The lower portion of the shell $o$, is furnished with friction rollers $g$, running the whole length of said shell, on which the roller P, bears and moves, to prevent the said roller from pressing too much or packing the material, in the bottom of said shell. Besides the motion of the roller P, around its axis, it has also a longitudinal reciprocating motion, caused by two friction rolls $h$, $i$—one at each end thereof, bearing against cams cut in the ends of said roller, so that the material is rubbed and reduced in contrary ways while it is being prepared for the extraction of—

*The hot pressing process.*—The reduced or digested, and heated, material, passing out of the end of the shell O, drops onto a heavy hair cloth belt R, which passes around the two rollers S, T. Above these two rollers S, T, are two other rollers U, V, around which pass an endless, leather (or other impervious material) belt W, these two belts R, W, being brought into close proximity between the two rollers T, V, so as to press out the oil remaining in the material which is carried through between the belts. The roller T, in its construction and operation, may be like F, H, heretofore described, so that the oil may pass into, and thence through suitable ducts to the ends of the said roller, and drop into a receiver X below it. The roller V, is simply grooved to give the belt W, a better hold, and prevent its slipping. After the material has passed through between the rollers V, T, it passes in between, and is a second time pressed by, the rollers Y, T—the said roller Y being constructed in all its essentials like F, H, T, and having a haircloth belt $k$, passing around it, and around a roller Z, above it. The oil pressed out between Y, T, drops into a receiver $l$, placed below the roller Y.

$m$, $n$, are two bearing rollers, which should be made adjustable so as to regulate the pressure between Y, and T. This completes the hot pressing, and the cake passing along the bed $p$, passes under a roller $o$, provided with knives or cutters $r$, and sever the cake into pieces suitable for handling.

The belts D, I, have been described as made of hair cloth, and lined or faced with other material to strengthen it. They may also have a backing of heavy woolen or worsted material, which while it allows the oil to pass through the belts, does not admit of its ready return.

There are many of the details of this machine, which it is not deemed necessary to describe as they are clearly shown in the drawings, as for instance the frame work, and the gearing for moving the various parts—the escape of condensed steam &c. These are of common construction and use, and can be varied to suit the particular kind of oil extracting is to be done.

Having thus fully described the nature of my invention, what I claim therein as new and desire to secure by Letters Patent is—

Extracting or expressing the oil from tempered oleaginous seeds, or other vegetable matter, by pinching and carrying said tempered material between two belts or aprons made of hair cloth or similar heavy porous materials, and thus forcing it through between compressing rollers, substantially as herein described; and this I claim whether the oil be cold pressed or hot pressed, or both, as herein set forth, or whether used in connection with a reducing apparatus or separate therefrom.

WILLIAM WILBER.

Witnesses:
 THOS. H. UPPERMAN,
 E. COHEN.